United States Patent
Yao et al.

(10) Patent No.: US 9,749,924 B2
(45) Date of Patent: Aug. 29, 2017

(54) METHODS, DEVICES AND COMPUTER PROGRAM PRODUCTS FOR IMPROVEMENTS IN INTERFERENCE CANCELLATION SCENARIOS

(75) Inventors: Chunhai Yao, Beijing (CN); Lars Dalsgaard, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/386,383

(22) PCT Filed: Mar. 20, 2012

(86) PCT No.: PCT/CN2012/072628
§ 371 (c)(1),
(2), (4) Date: Sep. 19, 2014

(87) PCT Pub. No.: WO2013/138996
PCT Pub. Date: Sep. 26, 2013

(65) Prior Publication Data
US 2015/0105077 A1    Apr. 16, 2015

(51) Int. Cl.
*H04W 36/30* (2009.01)
*H04W 36/00* (2009.01)
*H04W 36/04* (2009.01)

(52) U.S. Cl.
CPC ....... *H04W 36/30* (2013.01); *H04W 36/0061* (2013.01); *H04W 36/0072* (2013.01); *H04W 36/04* (2013.01)

(58) Field of Classification Search
CPC ..... H04W 36/30; H04W 36/18; H04W 36/08; H04W 36/14; H04W 36/12; H04W 36/0061; H04W 36/0072; H04W 36/04
See application file for complete search history.

(56) References Cited

U.S. PATENT DOCUMENTS

2005/0111408 A1* 5/2005 Skillermark ......... H04B 1/7105
370/331
2007/0275722 A1* 11/2007 Thorson ............ H04W 36/0055
455/436
(Continued)

FOREIGN PATENT DOCUMENTS

CN    102378206 A    3/2012
JP    2007/019982 A    1/2007
(Continued)

OTHER PUBLICATIONS

R1-120715; Nokia Siemens Networks, Nokia; "On signalling support for FeICIC"; 3GPP TSG RAN WG1 #68 Meeting; Dresden, Germany, Feb. 6-10, 2012, (4 pages).
(Continued)

*Primary Examiner* — Ted Wang
(74) *Attorney, Agent, or Firm* — Harrington & Smith

(57) ABSTRACT

Under a terminal device aspect, a device is proposed, wherein a control module is configured to report a candidate transceiver device for use after a handover via the transceiver module, and receive a handover instruction via the transceiver module. The handover instruction includes at least an indication that information is to be stored in a memory module for use in a processing to be applied after handover. Also, under a network transceiver device aspect, there is proposed a device wherein a control module is configured to receive a report indicative of a candidate transceiver device for use after a handover via the transceiver module, and upon processing the report, to issue a handover instruction via the transceiver module. Methods and respective computer program products are disclosed. Further, network transceiver device aspects related to such device to which handover is performed are encompassed.

23 Claims, 3 Drawing Sheets

(56) References Cited

U.S. PATENT DOCUMENTS

| | | | |
|---|---|---|---|
| 2011/0269466 A1 | 11/2011 | McGilly | 455/436 |
| 2012/0083245 A1* | 4/2012 | Adjakple | H04W 4/08 |
| | | | 455/411 |
| 2012/0329464 A1 | 12/2012 | Tanaka | |
| 2014/0192771 A1* | 7/2014 | Jung | H04W 36/08 |
| | | | 370/331 |

FOREIGN PATENT DOCUMENTS

| | | |
|---|---|---|
| KR | 20110007052 A | 1/2011 |
| WO | WO 2011/088465 A1 | 7/2011 |
| WO | WO 2011/099511 A1 | 8/2011 |
| WO | WO 2011114461 A1 | 9/2011 |
| WO | WO 2011/127089 A2 | 11/2011 |

OTHER PUBLICATIONS

LG Electronics; "Necessary Signalling and Air Interface Changes for Further Enhanced Non-CA-Based ICIC"; R1-113977; 3GPP TSG RAN WG1 Meeting #67; San Francisco, USA, Nov. 14-18, 2011; whole document (6 pages).

Samsung; "Views on signalling requirements for CRS interference handling"; R2-121495; 3GPP TSG-RAN2#77Bis meeting; Jeju, Korea, Mar. 26-30, 2012; whole document (3 pages).

* cited by examiner

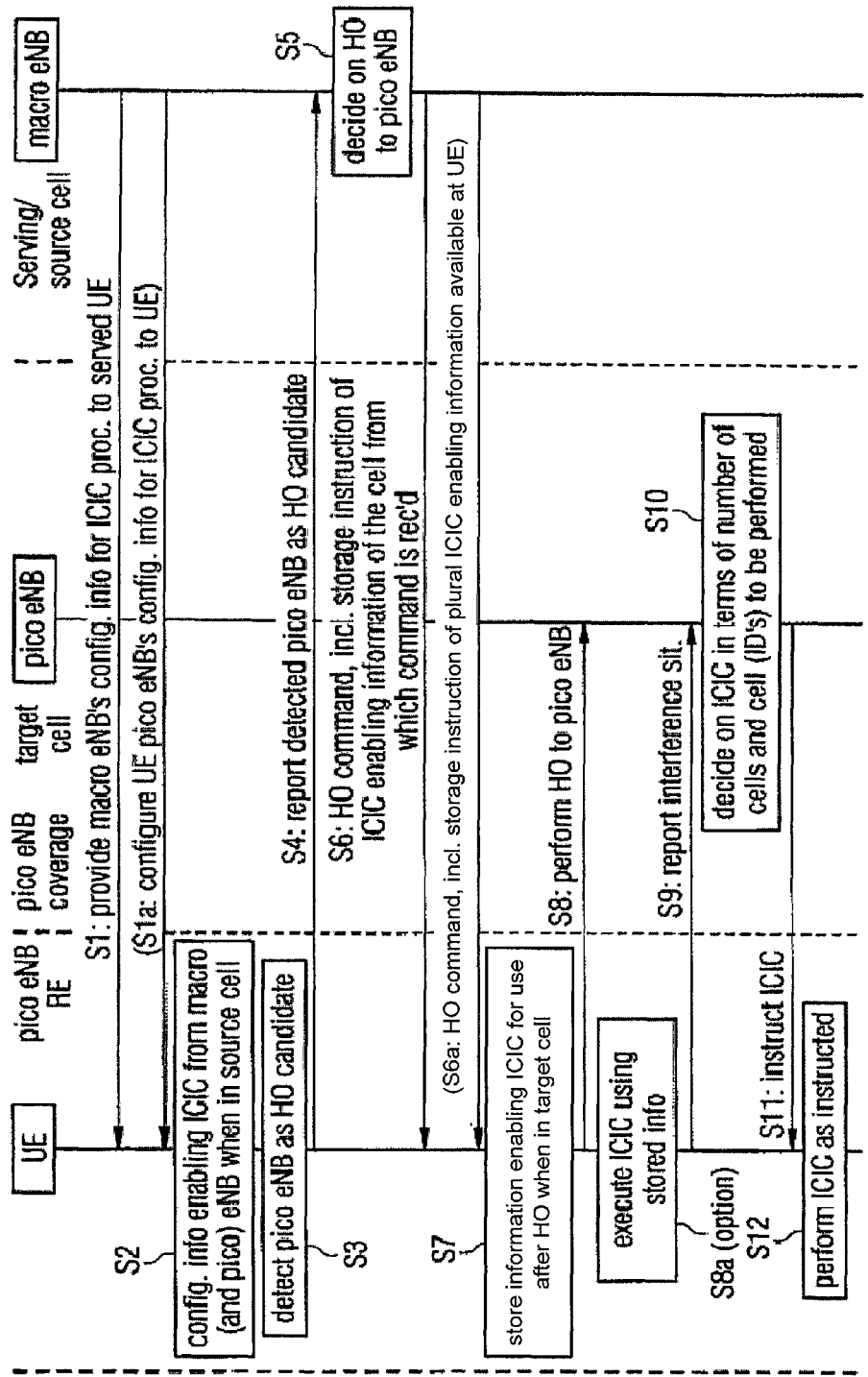

METHODS, DEVICES AND COMPUTER PROGRAM PRODUCTS FOR IMPROVEMENTS IN INTERFERENCE CANCELLATION SCENARIOS

FIELD OF THE INVENTION

The present invention relates to methods, devices and computer program products for improvements in interference cancellation scenarios. In particular, the present invention relates to such methods, devices, and computer program products applicable in mobile communication systems operating in cellular network environments in which intercell interference may occur.

BACKGROUND

Mobile data transmission and data services are constantly making progress. With the increasing penetration of such services, a terminal apparatus such as a user equipment UE (or mobile station MS, or the like; different names may apply for respective different standards) is capable of communicating within a cellular network environment. For example, a terminal device UE communicates within the network environment in which it is deployed or "camping" based on an available system configuration, generally adopted by a serving network transceiver station (e.g. base station BS or NodeB, or evolved NodeB, eNB) and related network architecture.

Typically, however, those cellular network environments are prone to interference, and also intercell interference may occur insofar as one network entity such as a network transceiver device (e.g. base station, NodeB, or evolved NodeB eNB) may interfere with its transmission with the transmission of another network transceiver device. Such interference phenomena may increase and/or be more dominant in case of network transceiver devices applying different transmission powers and hence exhibiting different coverage areas of the cells which they represent. One typical and exemplary scenario is for example a cellular network environment which adopts so-called macro cells (associated to/defined by macro eNBs) together with one or more pico or femto cells (associated to/defined by pico/femto eNBs) that are deployed within the coverage of the macro cell.

In the following, aspects of the invention will be exemplarily described with reference to such a scenario. In order to enhance legibility and understandability of the invention, for explanatory purposes only, reference is made to the communication system of LTE or LTE-A (Long Term Evolution, LTE-Advanced). However, reference to such specific system and use of specific signalling names or channel names or names of entities constituting such a communication network or partial network environment is not intended to limit the present invention to those specific examples. Rather, the principles of the present invention can be transferred to any other communication system adopting different channel/signaling/entity names as compared to LTE/LTE-A.

Also, the macro/pico cell environment is used as an example only and other environments can be used, e.g. environments having plural macro cells/macro eNBs and/or plural pico/femto eNBs within a macro cell, as long as (intercell) interference occurs or may be expected to occur between the respective cells.

In case of a terminal such as a UE communicating in such an environment while being "mobile" and thus moving within the network environment and the coverage of one or more cells, the terminal may be served by different network transceiver devices eNBs over time. In order to change the serving network transceiver device, the terminal needs to be handed over from an initially serving network transceiver device (source) to a target network transceiver device (which, upon handover, becomes the new serving network transceiver device).

Thus, when a terminal UE performs a handover from a macro cell to a pico cell in a cell range extension area, the terminal UE needs some signaling to assist the terminal UE to do cell specific reference signal (CRS) interference cancellation (IC). In this regard, some work is already ongoing in 3GPP (3rd Generation Partnership Project) on advanced receivers for UE in order to enable better overall performance e.g. in situations where the network is deploying cells using range extension (RE). So far, in those works, the understanding is that cell specific reference signal interference cancellation (CRS IC) is to be used by UEs in connected mode and there does not seem to be any need for idle mode UEs to apply CRS IC. Even in networks where enhanced ICIC (eICIC) is used and network is applying range extension (RE) by use of a concept of pico/macro coordinated almost blank subframe (ABS) muting, there is still some information transmitted in the downlink (DL) almost blank subframe (ABS) from the eNBs. For example, due to support of legacy UEs, the CRS is still transmitted in ABS as well as other DL signals like e.g. a primary broadcast control channel PBCH. These transmissions in ABS will cause interference and work is ongoing on how to limit the impact from this interference on the UE side by applying advanced receiver types which are capable of canceling this interference by applying CRS IC.

In order to apply CRS IC, the UE, however, needs to know which CRS to cancel and also some other basic information concerning the transmission from one or more interfering eNB. In order to get the most efficient system solution, support from the network should be provided in form of such related information to the UEs.

Currently, eICIC is only used by a UE in connected mode. In most of the cases, a UE in pica RE region will camp on a macro cell first in idle mode and then after connection setup, the eNB will handover the UE to pico cell. In this way the offload gain from macro (to pico) can be reached once the macro eNB cell has transferred "handling" of the UE communication to the pico eNB.

Related network signaling can be done in many alternative ways such as by a dedicated radio resource control (RRC) signaling or including the information in the handover (HO) command.

However, a problem with including the information in the HO command is that this command is normally sent at cell edge. However, at cell edge (i.e. border of neighboring cells) the probability of unsuccessful reception at UE side is somewhat higher (e.g. due to lower signal strength of serving eNB at the edge and/or due to increase in interference from a potential target eNB). Additionally one can expect that one of the (most) interfering cells (or at least a dominant interference point (DIP) to cancel) will be the (serving) cell from which the HO is performed.

Thus, there is still a need to further improve such systems in relation to enable proper operation of terminals in such scenarios in relation to CRS IC, and hence a need to provide improved methods, devices and computer program products for corresponding terminals and network transceiver devices.

SUMMARY

Various aspects of examples of the invention are set out in the claims.

According to a first aspect of the present invention, there is provided
a device as defined in claim 6, as well as
a device as defined in claim 15, as well as
a device as defined in claim 21.

According to a second aspect of the present invention, there is provided
a method as defined in claim 1, as well as
a method as defined in claim 11, as well as
a method as defined in claim 18.

Advantageous further developments of the respective devices/methods are as set out in respective dependent claims.

According to a third aspect of the present invention, there are provided computer program products comprising computer-executable components which, when the program is run on a computer, are configured to perform the method aspects as indicated above. The above computer program product/products may be embodied as a computer-readable storage medium.

Thus, performance improvement is based on methods, devices and computer program products which, in at least exemplary embodiments, adopt an indication in the HO command that the UE shall store necessary information of at least the serving cell, i.e. at least of the serving macro eNB (from which the HO command is received) that is needed for performing CRS IC in the target cell.

Thus, in at least an example embodiment, there is not included the actual CRS IC information in the HO command, but only an indication that the UE shall store (at least one of) such information for use in the HO target cell.

After UE has accomplished handover to the target cell, e.g. to a Pico eNB, if additional interference cancellation is needed, the pico eNB provides to the UE more cell information pertaining to cells for which CRS interference needs to be canceled, except the previous macro eNB information.

Alternatively, the HO command is designed such that the network indicates to the UE that the UE shall store more than the serving cell CRS IC information in the same manner as the one of the serving cell, i.e. macro eNB, related CRS IC information. That is, in such alternative it is such that the HO command indicates more specifically one or more specific cell information (e.g. received at an earlier point in the serving cell) to be stored at the UE for use in the target cell after handover thereto.

According to at least exemplary aspects of the invention, one or more of the following advantages can be accomplished:
terminal UE implementation is easier/less complex,
a better interference cancellation performance is achieved
size, i.e. amount of information signaled can be kept as low as possible, thereby increasing a probability that the information is correctly received when transmitted in HO scenarios
the amount of CRS IC information needed to be signaled to the UE in HO command is reduced by the proposed means,
efficient signaling,
lower signaling overhead,
reduction in HO command size,
additionally, in any case the previous serving macro cell is the dominant interference point (DIP), and in many cases it is enough that the UE cancel this DIP CRS interference; that means, the aspects of this invention are important in whatever situation, whether in case of a single cell interference or multiple cell interference needs to be cancelled.

BRIEF DESCRIPTION OF DRAWINGS

For a more complete understanding of example embodiments of the present invention, reference is now made to the following descriptions taken in connection with the accompanying drawings in which:

FIG. 3 illustrates a signaling diagram of signals exchanged between a terminal UE and an exemplary macro eNB and a pico eNB according to an embodiment of the invention.

DESCRIPTION OF EXEMPLARY EMBODIMENTS

Exemplary aspects/embodiments of the invention will be described herein below.

FIG. 1 illustrates block circuit diagrams of a terminal UE (FIG. 1(*a*)) and a macro eNB or a pico/femto eNB (FIG. 1(*b*)), respectively.

Figure 1A:
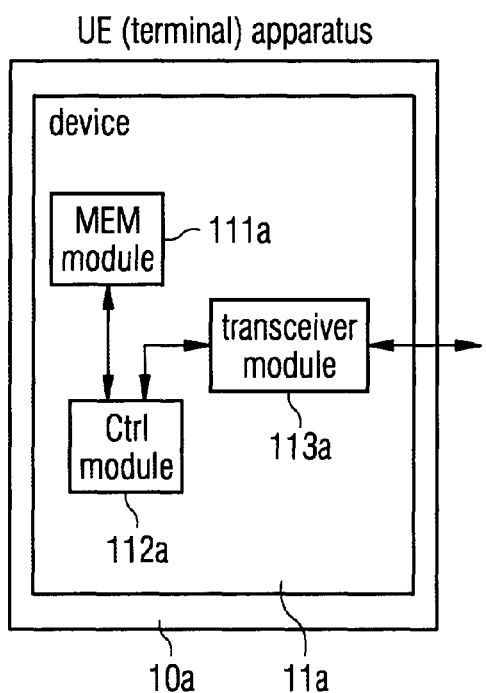
FIG. 1 illustrates block circuit diagrams of a terminal UE (FIG. 1(*a*)) and a macro eNB or a pico/femto eNB (FIG. 1(*b*)), respectively.

It has to be noted that aspects of this invention are implemented in, at least under an exemplary aspect, a terminal apparatus such as a UE 10*a*, or in a part thereof such as a device 11*a* of the UE. A corresponding block circuit diagram of a terminal UE is shown in FIG. 1A. Such device 11*a* can be a chip or chipset, or another subunit of the apparatus 110*a*, or the like. The device 11*a* comprises at least a memory module, MEM, 111*a* in which software code portions and/or data is stored or are stored. The memory module 111*a* is connected to a control module 112*a* such as a processor, or CPU, or ASIC. The control module 112*a* is connected to a transceiver module 113*a*. The transceiver module 113*a* is configurable for communication, i.e. configurable for the associated service such as LTE, or LTE-A, via network entities such as network transceiver devices with other terminals.

Figure 1B:
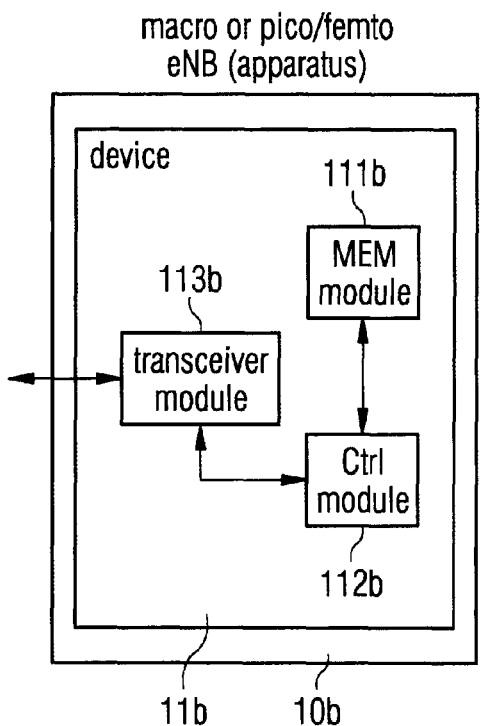

Likewise, under at least another exemplary aspect of the invention, an apparatus such as an eNB 10*b* comprises a device 11*b* according to an aspect of the invention. A corresponding block circuit diagram of a macro eNB and/or a pico/femto eNB is shown in FIG. 1B. Such device 11*b* can be a chip or chipset, or another subunit of the apparatus 1o*b*, or the like. The device 11*b* comprises at least a memory module, MEM, 111*b* in which software code portions and/or data is stored or are stored. The memory module 111*b* is connected to a control module ctrl 112*b* such as a processor, or CPU, or ASIC. The control module 112*b* is connected to a transceiver module 113*b*. The transceiver module 113*b* is configured for communication, i.e. configured for the associated service such as LTE, LTE-A, with the UE (optionally via the intermediary of further network entities).

Note that under an implementation aspect of the invention that is software "centric" rather than hardware "centric", respective modules may even be implemented as corresponding functional means (without departing from the gist of the invention).

Figure 2:
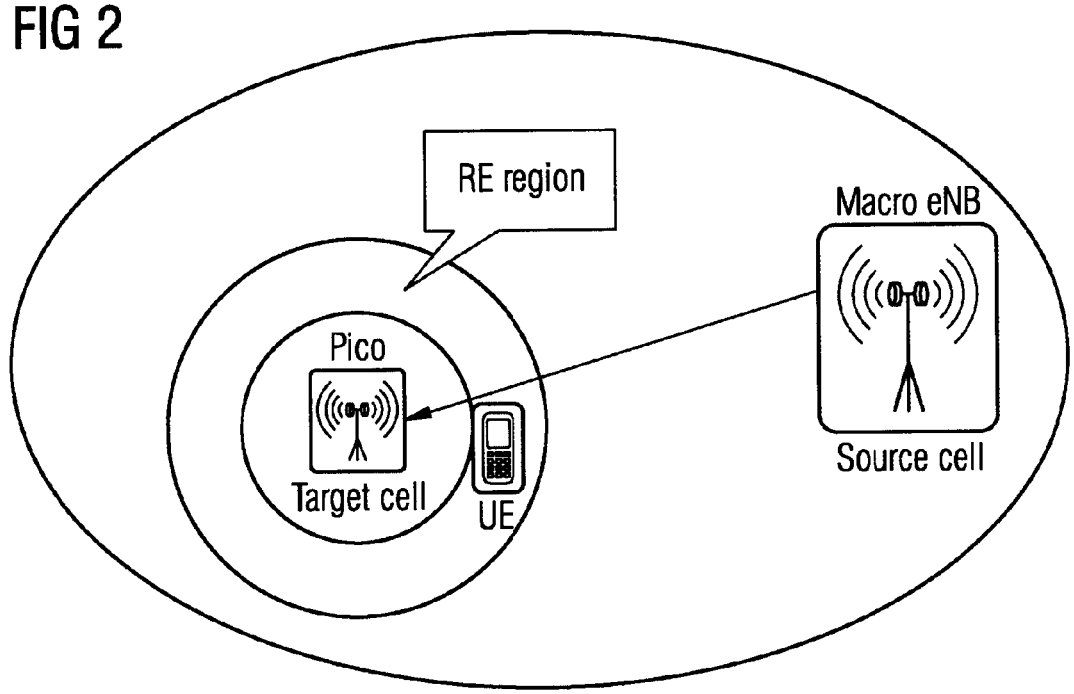
FIG. 2 illustrates an example of a cellular network environment in which scenario intercell interference may occur, and to which scenario embodiments of the present invention are applicable.

FIG. 2 illustrates an example of a cellular network environment in which scenario intercell interference may occur, and to which scenario embodiments of the present invention are applicable.

As shown in FIG. 2, a macro eNB defines a source cell, with/within which a terminal UE communicates, i.e. is in connected state for communication. Within a coverage area of the macro cell (represented by the bold outer line), a pica eNB is present defining a pica cell. The pica eNB (pica cell) represents a target eNB or cell to which the terminal UE is handed over from the macro eNB (macro cell). The coverage area of the pica cell is represented by the small circle line in bold. The pica cell is surrounded by a range extension RE region, as shown in FIG. 2. A range extension RE region represents the "additional" or extended coverage in case the macro eNB adjusts a handover offset, e.g. for network optimization and/or interference balancing between the macro and pica eNBs. Note that also femto cells/eNBs may be applicable for aspects of the present invention, as femto eNBs can be regarded as similar to the pica eNBS except for their still smaller coverage area.

Such a scenario/environment is present in many cases when discussing eICIC, i.e. a use case is a pica cell using RE within the coverage of a macro cell. The dominant interference point (DIP) in such scenario is the macro cell under which the pico cell is deployed. This is of course only one situation. Other exists but this scenario will be used to describe how at least aspects of the present invention are realized. Also it should be noticed that it has been shown that canceling of 2-3 of the strongest DIP's gives sufficient gain compared to complexity of further DIP cancellation i.e. canceling more than 3 dominant interference points (DIPs).

An alternative use case or implementation scenario is represented by a scenario in which a terminal UE is operating in a synchronized FDD E-UTRAN (FDD: Frequency Division Duplex, E-UTRAN: Enhanced Universal Terrestrial Radio Access Network) network in which small cells are deployed and RE is in use. Alternative examples to indicate in the HO command that the UE shall store the necessary information from current serving cell (where the HO command is received) may reside in specifying—for at least such synchronized networks—that a terminal UE generally stores information from (serving) cells which is needed for CRS IC purposes; this may be done/signaled e.g. when a terminal attaches/accesses to such network. Another alternative is to signal this to a UE using other RRC signaling means e.g. in measurement configuration, RRC-ConnectionReconfiguration. Note, however, that all those examples as given herein are given as non-limiting examples.

Also, the applicability of the present invention is not limited to pico cell arrangements and ICIC in connection with the use of RE. Rather this is only an example for describing aspects of the invention, which is applicable in other cell scenarios/configurations for intercell interference cancellation ICIC, e.g. not only to cell specific reference signal interference cancellation CRS IC, but also, as an example, applicable to primary broadcast channel PBCH cancellation. Since other use cases related to interference cancellation are also possible, the above examples are also not limiting for the present application.

Aspects of the present invention will be outlined herein below with reference to such scenario/environment as illustrated in FIG. 2.

When the UE is served by the macro eNB, it has all the necessary information concerning the macro eNB/cell in order to perform CRS IC originating from that macro cell when the UE is served by another cell (e.g. pico cell). Additionally the UE may already be configured with the information necessary for enabling CRS IC originating from the pico cell (or another macro or pico cell) while being in the macro cell. Generally, CRS IC is referred to herein as an example only, and aspects of the invention are for example also applicable to PBCH interference cancellation, or more generally to interference cancellation directed to interfering sources from other cells (intercell interference cancellation ICIC)

The information that is for example needed in order to perform CRS IC from a cell is at least one or more of the following:

Cell CRS port information,
Cell Multimedia Broadcast Single Frequency Network (MBSFN) configuration information, and
Cell cyclic prefix CP may be useful as well When the UE has detected and reported the pico cell as a HO candidate to the macro eNB, the network may hand over (perform a HO of) the UE to the pico eNB while the UE is in the pico cell RE, see FIG. 2. In this case it is beneficial to have the UE to perform CRS IC while being in the RE in order to improve the overall performance and maximize the benefits from RE. One "obvious" candidate cell (due to being responsible for the strongest interference contribution) that would need to be cancelled is the former serving macro cell. As mentioned, the UE has all necessary information concerning the macro cell prior to the inbound HO to the pico cell.

In order to lower the signaling overhead and also ensure aligned UE implementation, according to an aspect of the present invention, the eNB is enabled to indicate in the HO command that the UE shall store CRS IC relevant information from the cell in which the HO command is received (i.e. of the cell/eNB which issues the HO command). When indicated, the UE stores the information for use for CRS IC processing when "camping" in the HO target cell.

One way to implement this in a technical specification (TS) is e.g. by a simple 'serving cell CRS IC storing' indicator in the HO command. This allows the network to indicate specifically that the UE shall store the information for use in target cell and indicates the specific behavior to the UE such that aligned implementation will occur.

After UE handover to the pica eNB occurred, the pica eNB then decides which cell's interference and how many cell's CRS interferences are to be cancelled by UE. This is thus an efficient way to save HO command size, because the macro eNB does not exactly know a pico cell's (pico eNB's) "needs".

An alternative to only support storing the CRs IC relevant information from the cell in/from which the HO command is received resides in that the network (e.g. eNB or other entity such as mobility management entity MME) configures or has configured the UE to use CRS IC prior to handover; the network can indicate that at least more than the serving cell's (e.g. all, i.e. from all known/configured macro and/or pico cells/eNBs) CRS IC information is to be applied for CRS IC also in target cell.

It is of course also possible to enable the network with means to inform more specifically (down to a granulation of current CRS IC configuration e.g. in terms of port numbers) which information to store in HO situations.

The above feature(s) will reduce the amount of necessary CRS IC related information otherwise needed in the HO command (for enabling fast and efficient CRS IC in the target cell immediately after the HO) and reduce the need for having time critical CRS CI configuration message sent to the UE in the new pico cell immediately after the HO.

Now, a signaling diagram in relation to aspects of the present invention will be described. This will be described in more detail with reference to FIG. 3.

FIG. 3 shows a signaling diagram of signals exchanged between a terminal UE and an exemplary macro eNB and a pica eNB according to an embodiment of the invention. Entities involved are illustrated in horizontal direction, and signaling exchanged between those/processing performed at those is illustrated in vertical direction. A terminal UE is shown to reside in a pica eNBs range extension RE area, i.e. in an extension to the pica eNBs "normal" coverage. Still further, the UE is in the macro eNBs coverage.

In a step S1, the macro eNB provides the UE with the macro eNBs configuration information, at least with those information enabling the UE to perform time domain ICIC processing (such as e.g. CRS IC). Those information include macro eNB ABS pattern for neighboring cells measurement restriction, MBSFN configuration information. Optionally and/or alternatively, in a step S1a, the UE is provided with/configured to learn configuration information for time domain ICIC processing related to not only to the macro eNB but also other pica eNBs, such as the pico eNBs antenna (port) number information for RRM measurement.

In a step S2, the UE then is aware of this information, e.g. configuration information enabling the UE to perform time domain ICIC processing (e.g. CRS IC), the information originating from at the least the macro eNB when acting as a source and optionally from other macro eNBs and/or one or more pica eNBs.

In a step S3, the UE detects the pica eNB as a handover candidate, e.g. based on interference situation detected or measured, or based on other processing or information received.

In a step S4, the UE reports the detected pica eNB as HO candidate to the network, such as the network represented by the macro eNB. The report may also be sent to or forwarded (via the macro eNB) to a mobility management entity MME (not shown in FIG. 3).

In a step S5, the network, i.e. serving macro eNB and/or MME (not shown) decides whether a handover HO is to be performed to the candidate pico eNB or not, e.g. based on handover criteria which are not of particular interest for the purposes of the present invention and its aspects, as long as the HO decision is taken.

In a step S6, the macro eNB issue a HO command towards the target pico eNB. Such command includes at least an indication (or instruction) to store information enabling the UE to perform time domain ICIC such as CRS IC in the target cell and relating to at least the network transceiver device (i.e. (macro) eNB) from which the command is received and/or from which it is originated. Namely, as shown in step S6a, optionally, the indication/instruction to store CRS IC enabling information may relate to plural sets of information available at the UE, e.g. those configured to the UE in a step S1a. In this regard, the indication/instruction to store CRS IC enabling information may pertain to one or more of those time domain ICIC enabling information (e.g. CRS IC) associated at least to the serving macro eNB, other non-serving macro eNBs, one or more pico eNBs (differing from the target pico eNB to which HO is performed). The sets of information to be stored can be all those sets or a plurality of selected sets, e.g. selected by using a cell identity (ID) or eNB ID or Physical Cell Identity (PCI).

In a step S7, the UE stores the information (set(s) of information, i.e. one, more or all sets of information) enabling the UE to perform ICIC after handover when camping in the target cell (of the pico eNB).

In a step S8, the UE performs HO to the pico eNB and, in an optional step S8a, UE executes CRS IC using the stored information, in a step S9 for example, informs the pico eNB in a report of the experienced (measured) interference situation.

In a step S10, the target eNB (pico eNB) is then the newly assigned serving eNB and decides on the CRS IC to be performed by the UE in terms of the number of cells and in terms of for which particular individual cells (e.g. regarding their cell ID/PCI) CRS CI is to be performed.

In a step S11, the pico eNB instructs the UE accordingly by providing it with the number of cells and their cell IDs/PCI and other related information needed to perform the cancellation.

In a step S12, the UE performs CRS CI for the instructed cells using the information stored at and/or distributed to the UE for such use and/or purpose (as instructed in steps S6 and/or S6a). For example, the stored sets of information can be selected based on the cell ID or PCI and they were stored in the memory MEM of the UE based on an addressing scheme based on the cell IDs or PCI. Though, details of the storage and retrieval are not a primary concern of the present invention.

Hence, from the above detailed description of at least example aspects, it is understood that according to those aspects, the present invention encompasses, a method (as well as correspondingly configured device) comprising reporting a candidate transceiver device for use after a handover, and receiving a handover instruction, the handover instruction comprising at least an indication that information is to be stored for use in a processing to be applied after handover. It further comprises receiving the information for use in a processing to be applied after handover, wherein the information received is configuration information associated to at least a configuration of a serving network transceiver device. The processing to be applied after handover is e.g. an CRS interference cancellation processing. The information for use in a processing to be applied after handover comprises at least one of a cell's cell specific reference signals, CRS, port information, a cell's multimedia broadcast single frequency network, MBSFN, configuration information, and a cell's cyclic prefix, CP. The terminal aspect further comprises storing the information for use in a processing to be applied after handover.

Also, a device is proposed which comprises a control module, a memory module, and a transceiver module, wherein the control module is configured to report a candidate transceiver device for use after a handover via the transceiver module, and receive a handover instruction via the transceiver module, the handover instruction comprising at least an indication that information is to be stored in the memory module for use in a processing to be applied after handover. Other device aspects resemble the related method aspects pertaining to the terminal aspect.

Also, from the above detailed description of at least example aspects, it is understood that according to those aspects, the present invention encompasses, in relation to network transceiver devices and methods, similar and correspondingly "mirrored" features compared to the terminal related aspects.

In particular with regard to a so-called pico eNB which serves as an example of a network transceiver device involved, the present invention under such aspect envisages a method which comprises receiving a report on an interference situation experienced from a terminal (thus not limited to handover which was chosen as an example above, but such aspect is applicable also for other UEs (not facing a handover), and deciding on interference cancellation to be performed by the terminal based on information contained in the report. Such deciding may optionally or alternatively be based on the pico eNB's collected interference information. Note that a pico eNB can decide for which cells to do CRS IC, e.g. based on its location information, i.e. interference situation with other cells. This can be dependent on UE report. Such method may further comprise instructing the terminal in terms of the interference cancellation processing to be performed, wherein such instructing the terminal in terms of the interference cancellation processing to be performed may further comprise at least one of: a number of cells for which interference cancellation is to be performed and a cell's cell specific reference signals, CRS, port information, a cell's multimedia broadcast single frequency network, MBSFN, configuration information, and a cell's cyclic prefix, CP.

Likewise, such pico eNB, under an apparatus aspect is represented by a device which comprises a control module, a memory module, and a transceiver module, wherein the control module is configured to accomplish above outlined processings according to the corresponding method aspect(s).

Other systems can benefit also from the principles presented herein as long as they have a identical or similar properties, e.g. in relation to a handover command that includes an indication which information (already available) at the terminal is to be preserved or "inherited" for use in the cell to which the terminal is handed over.

Embodiments of the present invention may be implemented in software, hardware, application logic or a combination of software, hardware and application logic. The software, application logic and/or hardware generally reside on a memory module. A memory module may be a volatile or non-volatile memory module, such as a RAM, ROM, EPROM, EEPROM, or harddisk, or the like. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment, or network device such as an evolved NodeB eNB, whether macro or pico eNB.

The present invention relates in particular but without limitation to mobile communications, for example to environments under LTE, LTE-A, and subsequent releases thereof and can advantageously be implemented in user equipments or smart phones, or personal computers connectable to such networks. Particular usefulness will be exhibited for terminals or devices that participate in so-called CRS IC enabled scenarios applying e.g. at least one macro eNB and one or more pico eNBs (optionally also with range extension RE).

That is, it can be implemented as/in chipsets to connected devices, and/or modems thereof. More generally, all products which are subject to a similar environment will see performance improvement with the invention being implemented thereto.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes, under a terminal device aspect, a device, comprising a control module, a memory module, and a transceiver module, wherein the control module is configured to report a candidate transceiver device for use after a handover via the transceiver module, and receive a handover instruction via the transceiver module, the handover instruction comprising at least an indication that information is to be stored in the memory module for use in a processing to be applied after handover. Also, under a network transceiver device aspect, there is proposed a device, comprising a control module, a memory module, and a transceiver module, wherein the control module is configured to receive a report indicative of a candidate transceiver device for use after a handover via the transceiver module, and upon processing the report, to issue a handover instruction via the transceiver module, the handover instruction comprising at least an indication that information is to be stored in a memory module of a terminal device, for use in a processing to be applied after handover. Likewise, the present invention encompasses corresponding methods and respective computer program products. Further, network transceiver device aspects related to such device to which handover is performed are encompassed.

LIST OF EXEMPLARY
ABBREVIATIONS/ACRONYMS USED

UE user equipment
MS mobile station
BS base station
eNB evolved NodeB/enhanced NodeB
LTE Long Term Evolution
LTE-A LTE-Advanced
HO Handover
DIP Dominant Interference Point
CRS Cell specific Reference Signal
CP Cyclic Prefix
IC Interference Cancellation
PBCH Primary Boradcast CHannel
RE Range Extension
DL Downlink
UL Uplink
ABS Almost Blank Subframe
ICIC InterCell Interference Cancellation
eICIC enhanced ICIC (time domain ICIC)
FeICIC Further eICIC
3GPP 3rd Generation Partnership Project
RRC Radio Resource Control
MBSFN Multimedia Broadcast Single Frequency Network
MME Mobility Management Entity

What is claimed is:
1. A method, comprising:
reporting by a terminal device a candidate transceiver device for use after a handover, receiving by the terminal device a handover instruction, the handover instruction comprising at least an indication that information is to be stored for use in a processing to be applied after handover, wherein the receiving the handover instruction is in response to the reporting, and wherein the information concerns interference cancellation processing with respect to at least a cell corresponding to a second transceiver device that sent the handover instruction, performing a handover to a cell corresponding to the candidate transceiver device, and performing by the terminal device an intercell interference cancellation processing using the information.

2. A method according to claim 1, further comprising receiving the information for use in the processing to be applied after the handover, wherein the information received is configuration information associated to at least configuration of a serving network transceiver device.

3. A method according to claim 1, wherein the information for use in the processing to be applied after the handover comprises at least one of a cell's cell specific reference signals, CRS, antenna ports information, a cell's multimedia broadcast single frequency network, MBSFN, configuration information, and a cell's cyclic prefix, CP.

4. A method according to claim 1, further comprising storing the information for use in the processing to be applied after handover.

5. A computer program product comprising a non-transitory computer readable medium comprising computer-executable components which, when executed by a computer, are configured to cause the computer to perform the method steps according to claim 1.

6. A device, comprising:

a control module, a memory module, and a transceiver module, wherein the control module is configured to cause the device to perform operations comprising:

report a candidate transceiver device for use after a handover via the transceiver module, receive a handover instruction via the transceiver module, the handover instruction comprising at least an indication that information is to be stored in the memory module for use in a processing to be applied after handover, wherein the receiving the handover instruction is in response to the reporting, and wherein the information concerns intercell interference cancellation processing with respect to at least a cell corresponding to the second transceiver device that sent the handover instruction, perform a handover to a cell corresponding to the candidate transceiver device, and perform, after the handover, an intercell interference cancellation processing using the information.

7. A device according to claim 6, wherein the control module is further configured to receive the information for use in the processing to be applied after the handover via the transceiver module, wherein the information received is configuration information associated to at least a configuration of a serving network transceiver device.

8. A device according to claim 6, wherein the information for use in the processing to be applied after the handover comprises at least one of a cell's cell specific reference signals, CRS, port information, a cell's multimedia broadcast single frequency network, MBSFN, configuration information, and a cell's cyclic prefix, CP.

9. A device according to claim 6, wherein the control module is further configured to store the information for use in the processing to be applied after the handover in the memory module.

10. A method, comprising:

receiving, at a base station and from a terminal device, a report indicating a candidate transceiver device for use after a handover, and responsive thereto, issuing by the base station a handover instruction to the terminal device, the handover instruction comprising at least an indication that information is to be stored in a memory of the terminal device, for use in a processing to be applied by the terminal device after handover of the terminal device, wherein the processing to be applied after handover is an intercell interference cancellation processing.

11. A method according to claim 10, further comprising sending the information for use in the processing to be applied after the handover, wherein the information sent is configuration information associated to at least a configuration of a serving network transceiver device.

12. A method according to claim 10, wherein the information for use in the processing to be applied after the handover comprises at least one of a cell's cell specific reference signals, CRS, port information, a cell's multimedia broadcast single frequency network, BSFN, configuration information, and a cell's cyclic prefix, CP.

13. A computer program product comprising a non-transitory computer readable medium comprising computer-executable components which, when executed by a computer, are configured to cause the computer to perform the method steps according to claim 10.

14. The method of claim 10, wherein:

the information concerns interference cancellation processing with respect to at least a cell corresponding to a second transceiver device that sent the handover instruction, and the intercell interference cancellation processing is to use the information.

15. A device, comprising:

a control module, a memory module, and a transceiver module, wherein the control module is configured to receive a report indicative of a candidate transceiver device for use after a handover via the transceiver module, and upon processing the report, to issue a handover instruction via the transceiver module, the handover instruction comprising at least an indication that information is to be stored in a memory module of a terminal device, for use in a processing to be applied after handover, wherein the processing to be applied after handover is an intercell interference cancellation processing.

16. A device according to claim 15, wherein the control module is further configured to send the information for use in the processing to be applied after the handover via the transceiver module, wherein the information sent is configuration information associated to at least a configuration of a serving network transceiver device.

17. A device according to claim 15, wherein
the information for use in the processing to be applied after the handover comprises at least one of
a cell's cell specific reference signals, CRS, port information,
a cell's multimedia broadcast single frequency network, MBSFN, configuration information, and
a cell's cyclic prefix, CP.

18. The device of claim 15, wherein:
the information concerns interference cancellation processing with respect to at least a cell corresponding to a second transceiver device that sent the handover instruction, and
the intercell interference cancellation processing is to use the information.

19. An apparatus, comprising:
at least one memory comprising software code portions, and
at least one processor,
the at least one memory and software code portions are configured, with the at least one processor, to cause the apparatus to perform at least the following:
reporting a candidate transceiver device for use after a handover,
receiving, in response to the reporting, a handover instruction, the handover instruction comprising at least an indication that information is to be stored for use in a processing to be applied after handover, wherein the information concerns interference cancellation processing with respect to at least a cell corresponding to a second transceiver device that sent the handover instruction,
performing a handover to a cell corresponding to the candidate transceiver device, and
performing an intercell interference cancellation processing using the information.

20. An apparatus, comprising:
at least one memory comprising software code portions, and
at least one processor,
the at least one memory and software code portions are configured, with the at least one processor, to cause the apparatus to perform at least the following:
receiving a report from a terminal device indicating a candidate transceiver device for use after a handover, and
responsive thereto, issuing a handover instruction to the terminal device, the handover instruction comprising at least an indication that information is to be stored in a memory of the terminal device, for use in a processing to be applied by the terminal device after handover of the terminal device, wherein the processing to be applied after handover is an intercell interference cancellation processing.

21. The apparatus of claim 20, wherein:
the information concerns interference cancellation processing with respect to at least a cell corresponding to a second transceiver device that sent the handover instruction, and
the intercell interference cancellation processing is to use the information.

22. A method, comprising:
reporting by a terminal device a candidate transceiver device for use after a handover,
receiving by the terminal device a handover instruction, the handover instruction comprising at least an indication that information is to be stored for use in a processing to be applied after handover, and
performing by the terminal device an intercell interference cancellation processing,
wherein the information for use in the processing to be applied after the handover comprises at least one of:
a cell's cell specific reference signals, CRS, antenna ports information,
a cell's multimedia broadcast single frequency network, MBSFN, configuration information, and
a cell's cyclic prefix, CP.

23. An apparatus, comprising:
at least one memory comprising software code portions, and
at least one processor,
the at least one memory and software code portions are configured, with the at least one processor, to cause the apparatus to perform at least the following:
report a candidate transceiver device for use after a handover via the transceiver module,
receive a handover instruction via the transceiver module, the handover instruction comprising at least an indication that information is to be stored in the memory module for use in a processing to be applied after handover, and
perform an intercell interference cancellation processing,
wherein the information for use in the processing to be applied after the handover comprises at least one of:
a cell's cell specific reference signals, CRS, port information,
a cell's multimedia broadcast single frequency network, MBSFN, configuration information, and
a cell's cyclic prefix, CP.

* * * * *